(12) United States Patent
Dueck

(10) Patent No.: US 7,566,019 B1
(45) Date of Patent: Jul. 28, 2009

(54) BIOMASS SHREDDER SYSTEM

(75) Inventor: Raymond Dueck, Arborg (CA)

(73) Assignee: BEST, Inc., Morris, Manitoba (CA)

(*) Notice: Subject to any disclaimer, the term of this patent is extended or adjusted under 35 U.S.C. 154(b) by 101 days.

(21) Appl. No.: 11/620,451

(22) Filed: Jan. 5, 2007

(51) Int. Cl.
*B02C 19/00* (2006.01)

(52) U.S. Cl. .................... 241/277; 241/283; 241/605

(58) Field of Classification Search ........... 241/605, 241/277, 282.1, 282.2, 283, 186.35
See application file for complete search history.

(56) References Cited

U.S. PATENT DOCUMENTS 3,208,491 A * 9/1965 Bliss ............... 241/186.35
4,163,524 A * 8/1979 Lundahl et al. ........ 241/30
6,827,304 B2 * 12/2004 Rousseau ............. 241/73

* cited by examiner

*Primary Examiner*—Mark Rosenbaum

(57) ABSTRACT

A biomass shredder system for providing a consistent flow of fuel to a furnace or feed application. The biomass shredder system includes a conveyer unit to carry a straw bale, a separator unit attached to the conveyer unit, wherein the separator unit includes a plurality of separator members and a shredding unit slidably attached to the separator unit. The shredding unit includes a plurality of blades positioned in-between each of the plurality of separator members, wherein the plurality of blades shred the straw bale.

15 Claims, 7 Drawing Sheets

BIOMASS SHREDDER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to bale shredders and more specifically it relates to a biomass shredder system for efficiently providing a consistent flow of fuel to a furnace or feed application.

2. Description of the Related Art

Any discussion of the prior art throughout the specification should in no way be considered as an admission that such prior art is widely known or forms part of common general knowledge in the field.

Producing bio-fuel and other natural products from natural living and recently living biological material, such as but not limited to straw is generally becoming common because of the high demand for fuel and energy. To utilize straw for fuel the straw must generally be shredded from a bale so the straw can be more easily burned. Bale shredders have been widely used over the years. Bale shredders generally feed a bale into a plurality of cutting or shredding devices wherein the bale is ground up.

Generally bale shredders are designed wherein the straw bales are continually fed into the bale shredders. Generally bale shredders do not regulate the flow of straw that enters the bale shredder. Not regulating the flow of bales into the bale shredder can cause an irregularity in the burning of the furnace and subsequently the efficiency of the furnace. Since the bale shredders generally do not include any type of regulation device, the bale shredders may also become too full and thus bog down again causing an irregular and inefficient furnace.

While these devices may be suitable for the particular purpose to which they address, they are not as suitable for providing a consistent flow of fuel to a furnace or feed application. Bale shredders do not generally include a means for regulating the flow of bales into the bale shredder. This may cause an irregular and inefficient burning furnace.

In these respects, the biomass shredder system according to the present invention substantially departs from the conventional concepts and designs of the prior art, and in so doing provides an apparatus primarily developed for the purpose of providing a consistent flow of fuel to a furnace or feed application.

BRIEF SUMMARY OF THE INVENTION

In view of the foregoing disadvantages inherent in the known types of bale shredders now present in the prior art, the present invention provides a new biomass shredder system construction wherein the same can be utilized for providing a consistent flow of fuel to a furnace or feed application.

The general purpose of the present invention, which will be described subsequently in greater detail, is to provide a new biomass shredder system that has many of the advantages of the bale shredders mentioned heretofore and many novel features that result in a new biomass shredder system which is not anticipated, rendered obvious, suggested, or even implied by any of the prior art bale shredders, either alone or in any combination thereof.

To attain this, the present invention generally comprises a conveyer unit to carry a straw bale, a separator unit attached to the conveyer unit, wherein the separator unit includes a plurality of separator members and a shredding unit slidably attached to the separator unit. The shredding unit includes a plurality of blades positioned in-between each of the plurality of separator members, wherein the plurality of blades shred the straw bale.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a biomass shredder system that will overcome the shortcomings of the prior art devices.

A second object is to provide a biomass shredder system for providing a consistent flow of fuel to a furnace or feed application.

Another object is to provide a biomass shredder system that provides a steady and consistent flow of bales into a bale shredder.

An additional object is to provide a biomass shredder system that efficiently shreds a bale before the straw bale enters the furnace.

A further object is to provide a biomass shredder system that shelters the bales from cold and rain before entering the furnace.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
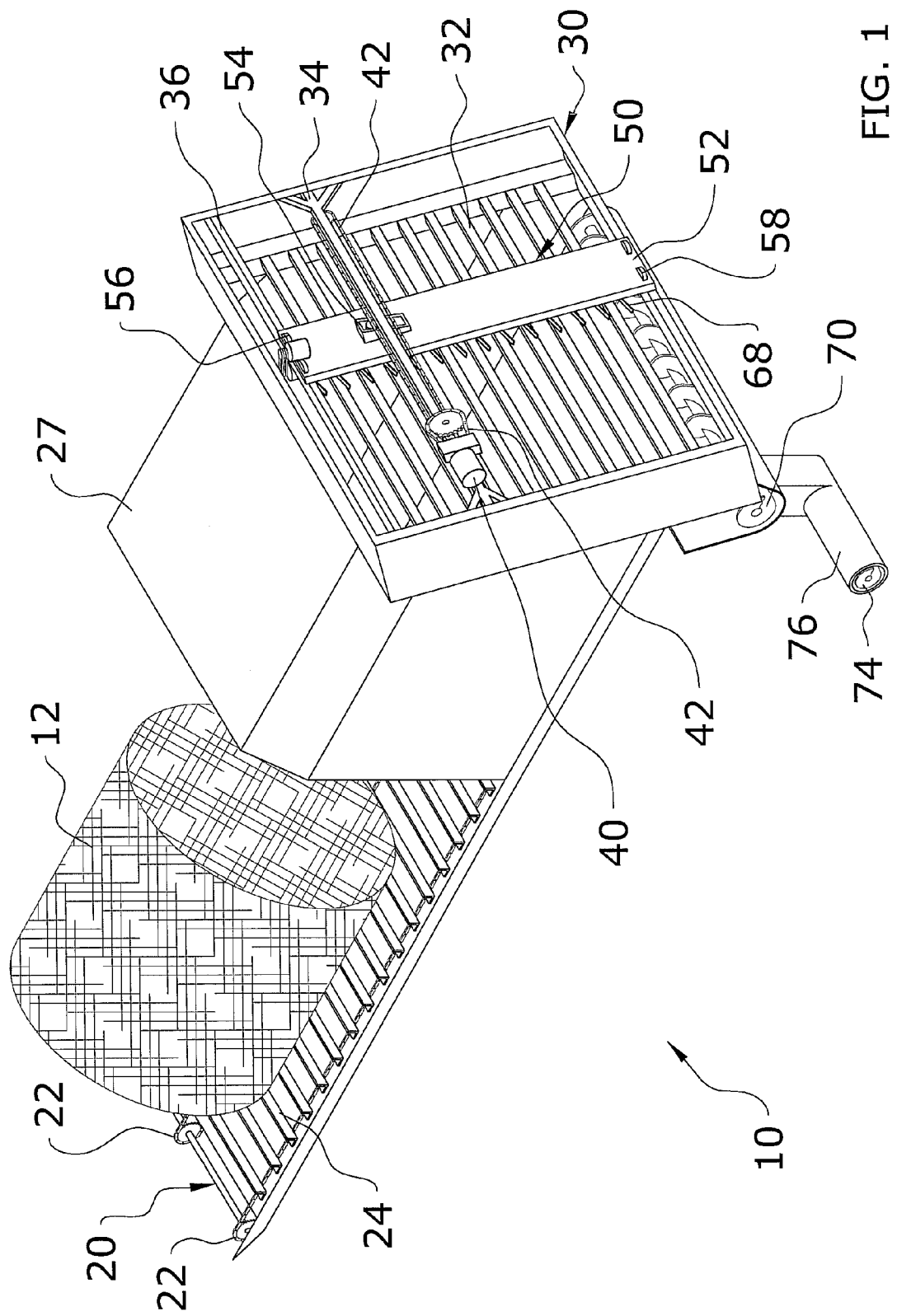
FIG. 1 is an upper perspective view of the present invention in use with a straw bale placed upon the first transfer unit.

Turning now descriptively to the drawings, in which similar reference characters denote similar elements throughout the several views, FIGS. 1 through 7 illustrate a biomass shredder system 10, which comprises a first transfer unit 20 to carry a straw bale 12, a separator unit 30 attached to the first transfer unit 20, wherein the separator unit 30 includes a plurality of separator members 32 and a shredding unit 50 slidably attached to the separator unit 30. The shredding unit 50 includes a plurality of blades 68, 69 positioned in-between each of the plurality of separator members 32, wherein the plurality of blades 68, 69 shred the straw bale 12. It is appreciated that the biomass shredder system 10 may be utilized to shred various materials rather than the straw bales 12.

B. First Transfer Unit

The first transfer unit 20 preferably functions in a similar manner to a standard conveyer unit. It is appreciated however that the first transfer unit 20 may be comprised of various configurations rather than the preferred embodiment, such as but not limited to a plunger structure. The first transfer unit 20 is preferably comprised of a width substantially similar or greater than the width of a straw bale 12 as illustrated in FIGS. 1 through 4. The first transfer unit 20 preferably includes at least two sprockets. Each of the two sprockets is preferably positioned at opposite ends of the first transfer unit 20.

The sprockets preferably receive a first elongated member 22. The first elongated member 22 preferably rotates about the sprockets. The first elongated member 22 is also preferably comprised of a chain configuration as shown in FIGS. 1 through 4. The first transfer unit 20 further preferably includes two more pairs of sprockets, wherein each of the pairs of sprockets are positioned at opposing ends of the first transfer unit 20.

The two more pairs of sprockets each preferably receive a first elongated member 22. It is appreciated that the first transfer unit 20 may include a greater or lesser number of sprockets and first elongated members 22 than the preferred embodiment, wherein the number of sprockets and elongated members utilized in the first transfer unit 20 are sufficient in supporting at least one straw bale 12. It is appreciated that the first elongated member 22 may be comprised of various configurations rather than the preferred embodiment, such as but not limited to a belt configuration.

The first transfer unit 20 also preferably includes a plurality of cross members 24. The cross members 24 are preferably attached to an outer side of the first elongated members 22. The cross members 24 also preferably extend across the first transfer unit 20, wherein the cross members 24 are substantially perpendicular to a longitudinal axis of the first elongated members 22 and the first transfer unit 20 as shown in FIGS. 1 through 4. Further, the cross members 24 are preferably spaced equidistant from each other.

The cross members 24 are preferably comprised of an angle iron configuration as shown in FIGS. 1 through 6. The cross members 24 also preferably extend perpendicularly outward from the elongated members. The angle iron configuration of the cross members 24 prevents the straw bale 12 from slipping back along the first transfer unit 20 once the straw bale 12 reaches the separator unit 30 and shredding unit 50. It is appreciated that the cross members 24 may be comprised of various configurations rather than the preferred embodiment all which are capable of supporting at least one straw bale 12. It is also appreciated that a standard conveyer belt may be utilized with the first transfer unit 20 rather than the plurality of cross members 24.

The first transfer unit 20 also preferably includes a pair of side members 26. The side members 26 preferably extend out from opposing sides of the first transfer unit 20 as shown in FIGS. 1 through 4. The side members 26 serve to prevent the straw bale 12 from slipping off the side of the first transfer unit 20.

A shield member 27 is preferably positioned substantially near a front of the first transfer unit 20 nearest the separator unit 30. The shield member 27 preferably extends up and over the first transfer unit 20 as illustrated in FIGS. 1 through 6. The shield member 27 helps to warm and dry the straw bales 12 and shield the straw bales 12 from outside elements prior to the straw bales 12 entering the shredding unit 50. Warming and drying the straw bales 12 is beneficial in that as the straw bales 12 enter the augers 70, 74 and subsequently the furnace the shredded straw 14 will burn faster and more efficiently. It is also appreciated that the shield member 27 may extend over an entire upper surface of the first transfer unit 20.

Figure 5:
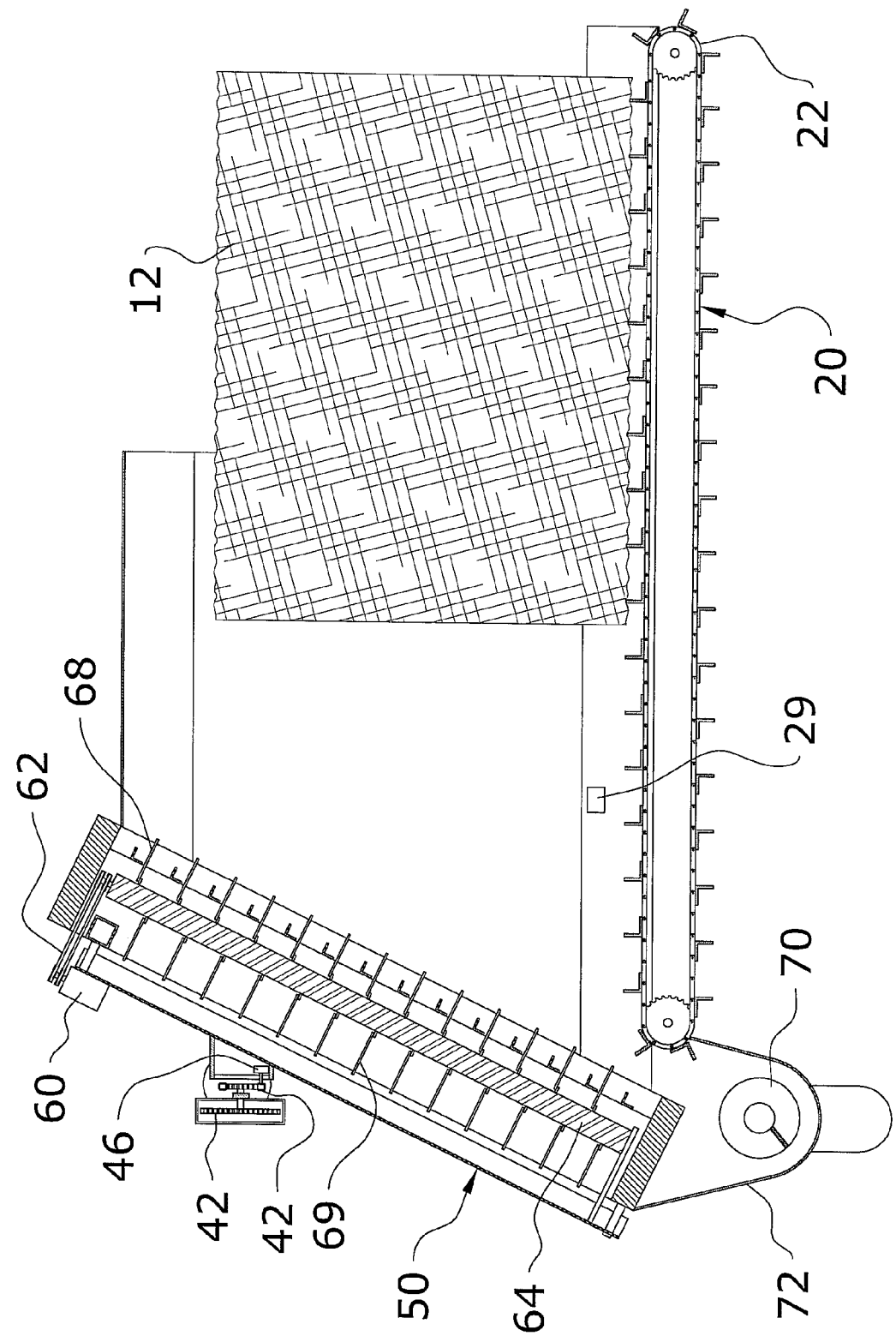
FIG. 5 is a side cross-sectional view of the present invention with a straw bale placed upon the transfer unit.

The first transfer unit 20 also preferably includes at least one sensor 29 as shown in FIG. 5. The sensor 29 is preferably positioned substantially near the separator unit 30. The sensor 29 detects the straw bales 12 when placed upon the first transfer unit 20.

C. Separator Unit

The separator unit 30 is preferably positioned substantially near a front end of the first transfer unit 20 in relation to the direction of travel of the first transfer unit 20. The separator unit 30 is preferably positioned at a forward angle in relation to the first transfer unit 20. The separator unit 30 is further positioned to form a slightly acute angle with the first transfer unit 20 as illustrated in FIGS. 1 through 6.

The separator unit 30 is preferably comprised of a square configuration. The separator unit 30 is further preferably comprised of a metal material to provide added strength to the biomass shredder system 10; however it is appreciated that the separator unit 30 may be comprised of various materials such as but not limited to plastic. A first cross-sectional distance of the separator unit 30 is also preferably substantially greater than a second cross-sectional distance of the straw bale 12.

The separator unit 30 also preferably includes a plurality of separator members 32. A front surface of the separator members 32 is preferably aligned upon a first plane. The first plane of the separator members 32 also preferably forms an acute angle with respect to a support surface of the first transfer unit 20. Further, the first plane preferably forwardly extends towards the first transfer unit 20. The separator members 32 preferably extend across the separator unit 30, wherein the separator members 32 preferably perpendicularly intersect a longitudinal axis of the first transfer unit 20. Further, the separator members 32 are preferably spaced equidistant from each other.

Figure 6:
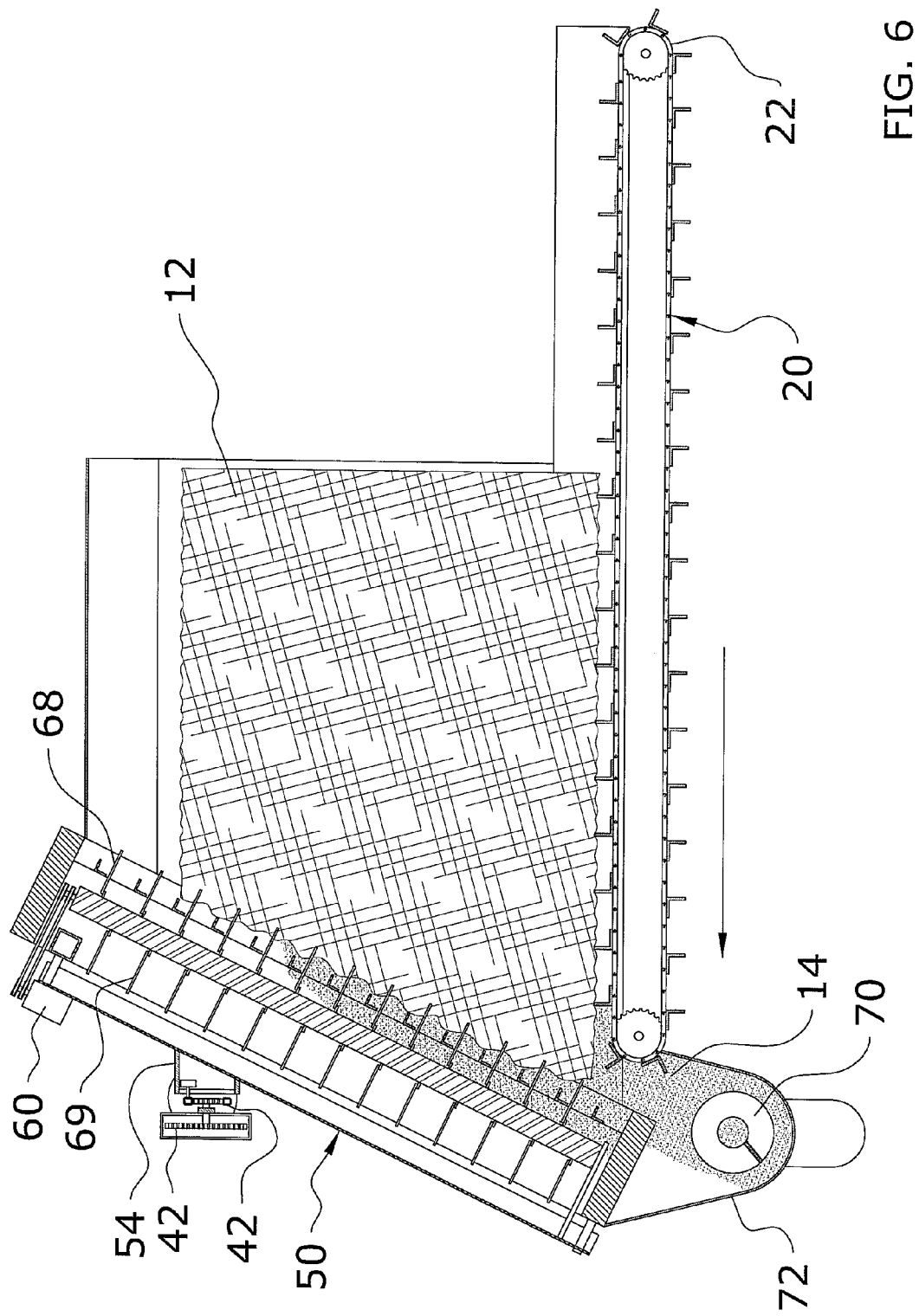
FIG. 6 is a side cross-sectional view of the present invention with the shredding unit shredding a straw bale.
Figure 7:
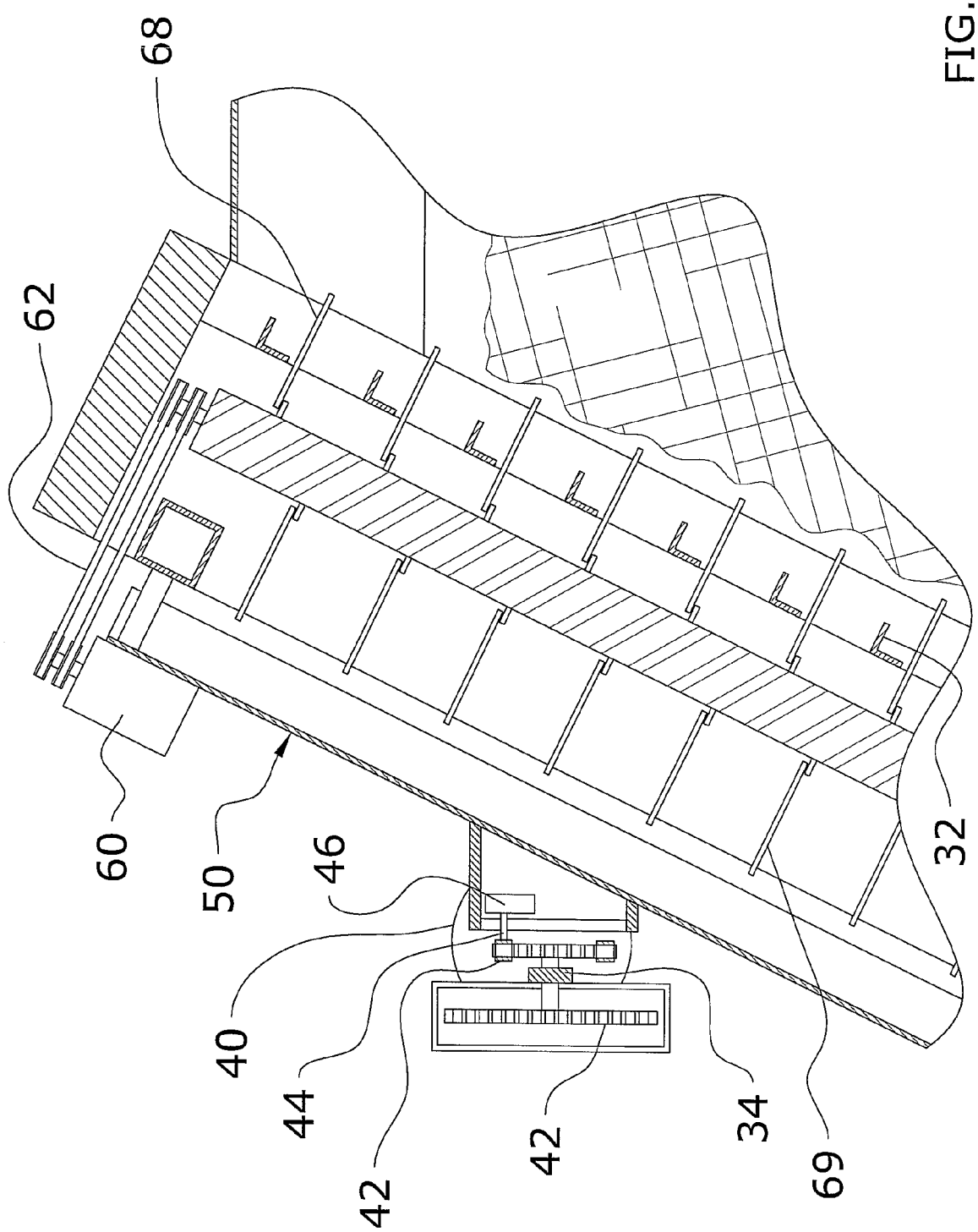
FIG. 7 is a magnified side cross-sectional view of the connection between the receiving member and the second elongated member.

The separator members 32 are preferably comprised of an angle iron configuration as shown in FIGS. 1 through 7. The separator members 32 also preferably extend perpendicularly outward from the first plane of the separator members 32. Further, the separator members 32 preferably extend towards the first transfer unit 20 as shown in FIGS. 5 through 7. The angle iron configuration of the separator members 32 serves to allow the straw bale 12 to be forced through the first plane of the separator members 32 and into the plurality of blades 68, 69 and subsequently into the second transfer unit 70. It is appreciated the separator members 32 are preferably comprised of a plurality of individual members; however it is also appreciated that the separator member 32 may be comprised of a single member with a plurality of separator channels cutout of the separator member 32.

The separator unit 30 also preferably includes a first support member 34 and a track member 36 as shown in FIGS. 1 through 4. The first support member 34 is preferably comprised of an elongated configuration. The first support member 34 preferably extends across the separator unit 30 and is preferably positioned in a substantially similar orientation to the separator members 32. The first support member 34 is also preferably positioned on an opposing side of the separator members 32 as the first transfer unit 20.

The track member 36 is preferably positioned in a similar orientation to the first support member 34 and the separator members 32. The track member 36 is preferably comprised of an elongated configuration. The track member 36 is also preferably positioned substantially near an upper end of the separator unit 30 as illustrated in FIGS. 1 through 6.

D. First Motor

The first motor 40 is preferably comprised of a standard motor configuration. The first motor 40 preferably provides a mechanical force to be applied to the shredding unit 50 to slidably adjust the shredding unit 50 back and forth along a longitudinal axis of the separator members 32. The first motor 40 is preferably attached to the first support member 34 as shown in FIGS. 1 through 4.

The first motor 40 preferably drives at least one second elongated member 42, wherein each second elongated member 42 rotates around a pair of sprockets. The second elongated member 42 is preferably comprised of a chain configuration. Further, at least one of the second elongated members 42 extends substantially across the first support member 34 as shown in FIGS. 1 through 4. It is appreciated that the second elongated member 42 may be comprised of various configurations rather than the preferred embodiment, such as but not limited to a belt configuration.

The second elongated member 42 that extends across the first support member 34 preferably includes a connecting member 44. The connecting member 44 preferably extends perpendicularly outward from the second elongated member 42. Further the connecting member 44 preferably extends toward the first transfer unit 20 as shown in FIGS. 5 through 7.

The connecting member 44 preferably includes a roller member 46. The roller member 46 is preferably comprised of a circular configuration. The roller member 46 is preferably able to rotate about the connecting member 44. The roller member 46 is also preferably positioned at an outer most point of the connecting member 44, wherein the outer most point is towards the first transfer unit 20. The connecting member 44 and the roller member 46 are preferably comprised of separately formed structures; however it is appreciated that the connecting member 44 and the roller member 46 may be comprised of an integrally formed structure.

E. Shredding Unit

The shredding unit 50 preferably evenly shreds the straw bale 12 to produce shredded straw 14 to burn. A first longitudinal axis of the shredding unit 50 is preferably substantially perpendicular to a second longitudinal axis of the separator members 32 as illustrated in FIGS. 1 through 6. The shredding unit 50 preferably includes a second support member 52.

The second support member 52 is preferably comprised of an elongated configuration and extends from substantially near an upper end of the separator unit 30 to substantially near a lower end of the separator unit 30. The second support member 52 is also preferably comprised of a C-channel configuration as illustrated in FIGS. 5 and 6. A third plane of the second support member 52 is also preferably parallel to the first plane of the separator members 32.

The shredding unit 50 also includes a receiving member 54. The receiving member 54 is preferably comprised of a rectangular configuration; however other configurations rather than the preferred embodiment may be utilized with the receiving member 54. The receiving member 54 preferably extends out from the second support member 52 at a substantially similar position to where the second elongated member 42 intersects the second support member 52 as illustrated in FIGS. 1 through 7.

The receiving member 54 preferably receives the roller member 46 of the second elongated member 42. The roller member 46 is preferably secured within the receiving member 54. The second support member 52 and the shredding unit 50 travel along with the second elongated member 42 as the second elongated member 42 rotates around the sprockets.

A longitudinal inner length of the receiving member 54 is preferably substantially similar or slightly greater than the diameter of the sprocket that receives the second elongated member 42 that extends across the first support member 34 as shown in FIGS. 1 through 4. The length of the receiving member 54 ensures that the roller member 46 is able to freely move up and down with the connecting member 44 as the connecting member 44 travels around the sprocket.

The second support member 52 also includes at least one first roller 56 and at least one second roller 58. The first roller 56 and the second roller 58 are each preferably rotatably attached to the second support member 52. The first roller 56 and the second roller 58 are preferably comprised of circular configurations. The first roller 56 and the second roller 58 are each preferably positioned on an opposing longitudinal end of the second support member 52. The first roller 56 is preferably positioned against the bottom edge of the separator unit 30 as shown in FIGS. 1 through 6.

The second roller 58 is preferably positioned against the track member 36 as shown in FIGS. 1 through 6. The first roller 56 and the second roller 58 allow the shredding unit 50 to slidably adjust about the separator unit 30 along with the second elongated member 42. It is appreciated that the second support member 52 may include a plurality of rollers positioned at various places along the second support member 52 all which allow the second support member 52 to slidably adjust along the separator unit 30.

The shredding unit 50 also includes a second motor 60. The second motor 60 is preferably comprised of a standard motor configuration. The second motor 60 preferably rotates a rotating member 64 via at least one third elongated member 62. The third elongated member 62 is preferably comprised of a belt configuration and is rotated by at least one pulley, wherein the second motor 60 rotates the pulley.

The third elongated member 62 is preferably positioned substantially near an upper end of the second support member 52 and extends through the separator unit 30 in-between the track member 36 and the top end of the separator unit 30 as illustrated in FIGS. 1 through 6. It is appreciated that the third elongated member 62 may be comprised of various configurations rather than the preferred embodiment, such as but not limited to a chain configuration.

The rotating member 64 is preferably comprised of a cylindrical configuration. A first longitudinal length of the rotating member 64 is preferably substantially similar to a second longitudinal length of the second support member 52. The rotating member 64 is also preferably substantially parallel with the second support member 52. A lower end of the rotating member 64 is also preferably rotatably attached to a lower support 66 as shown in FIGS. 5 and 6. An opposing end of the lower support 66 also preferably attaches to the separator unit 30 to provide stability to the rotating member 64.

The rotating member 64 includes a plurality of blades 68, 69, wherein the blades are comprised of a configuration to shred the straw bales 12. The plurality of blades 68, 69 preferably extend out from the rotating member 64. The plurality of blades 68, 69 are also preferably pivotally attached to the rotating member 64, wherein the blades 68, 69 may pivot back and forth while being swung around by the rotating member 64.

Figure 2:
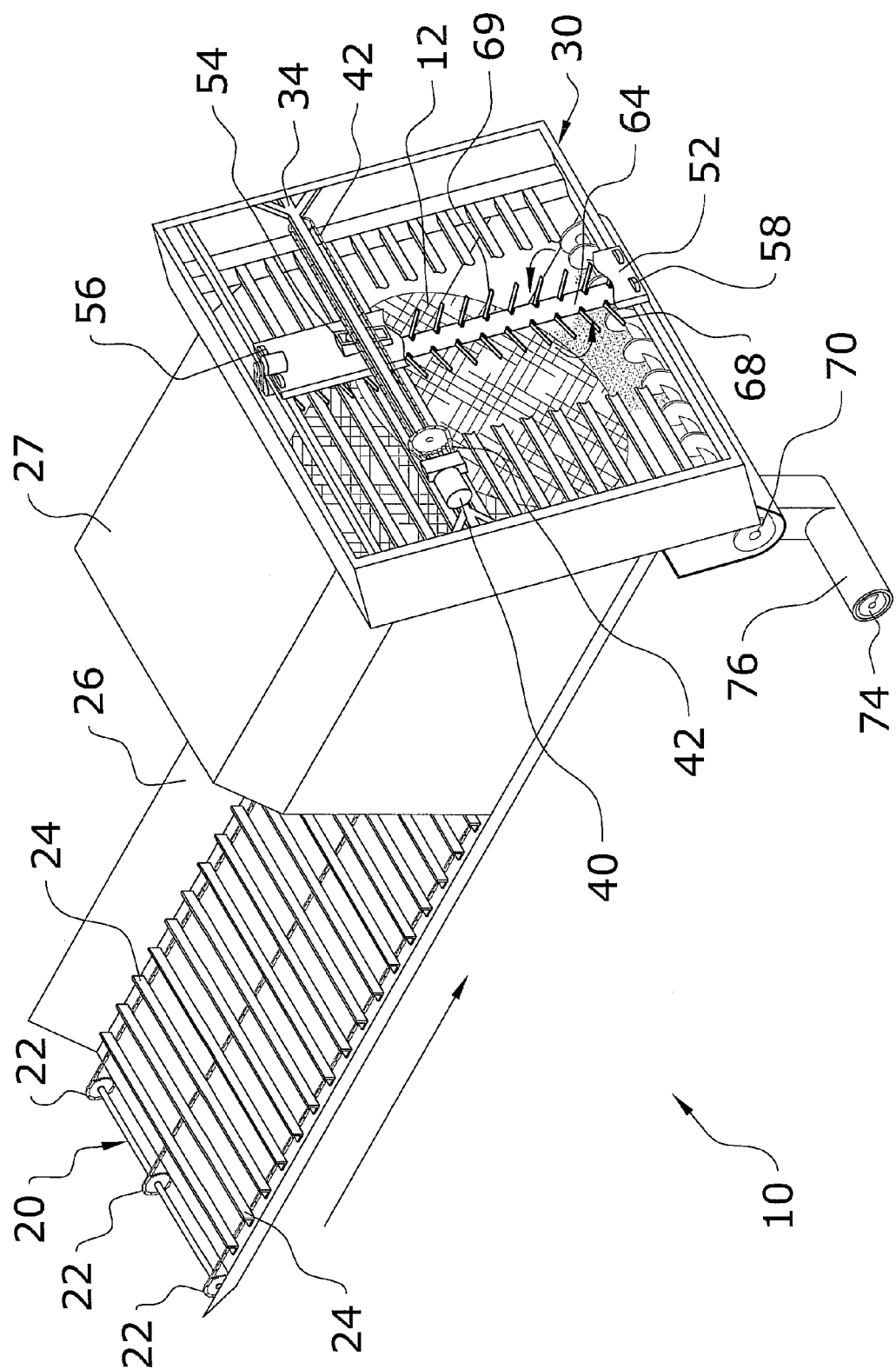
FIG. 2 is an upper perspective view of the present invention in use with the shredding unit shredding a straw bale and the second support member cutaway.
Figure 3:
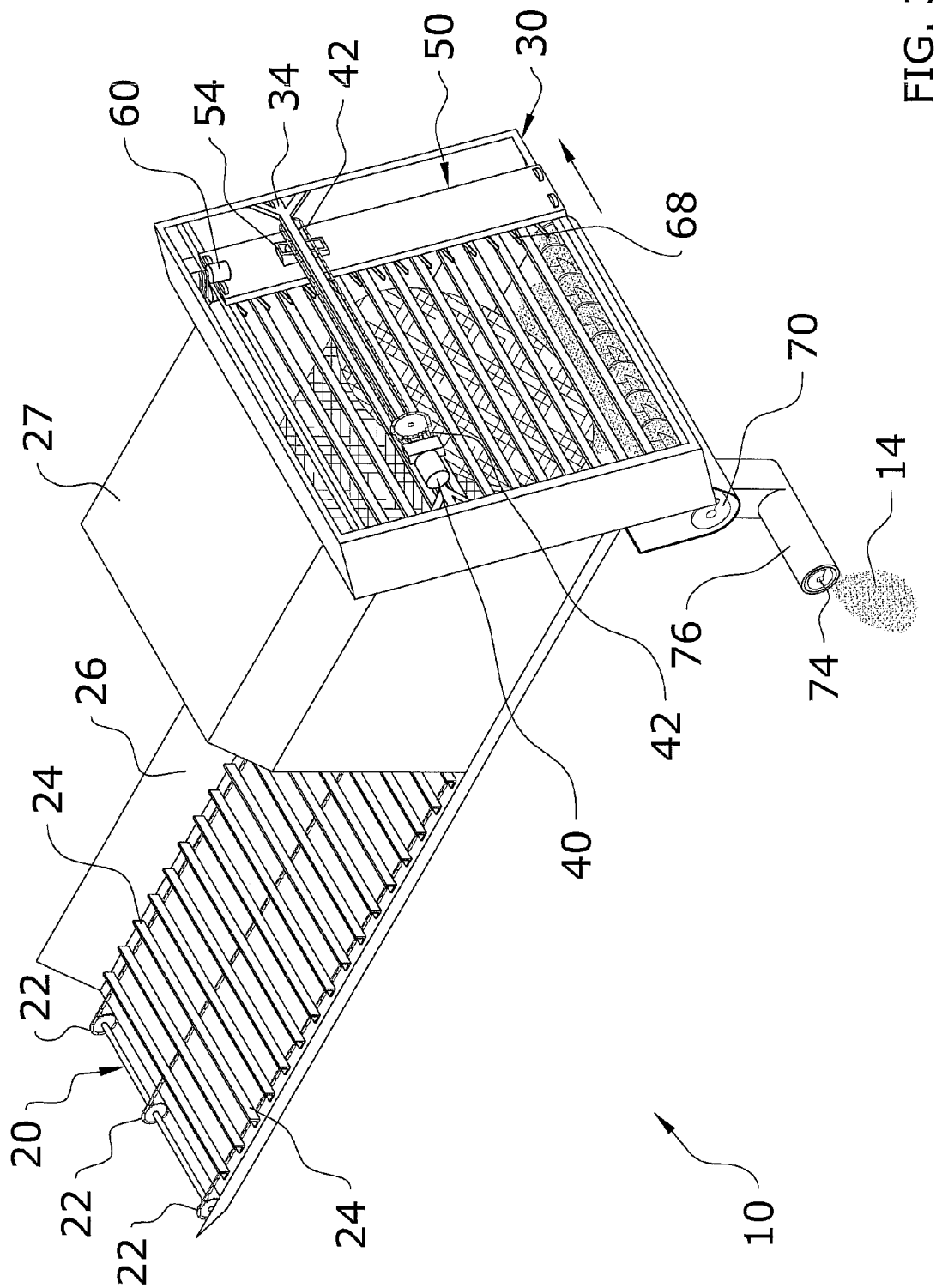
FIG. 3 is an upper perspective view of the present invention in use with the shredding unit shredding a straw bale and the shredding unit moving in a first direction.
Figure 4:
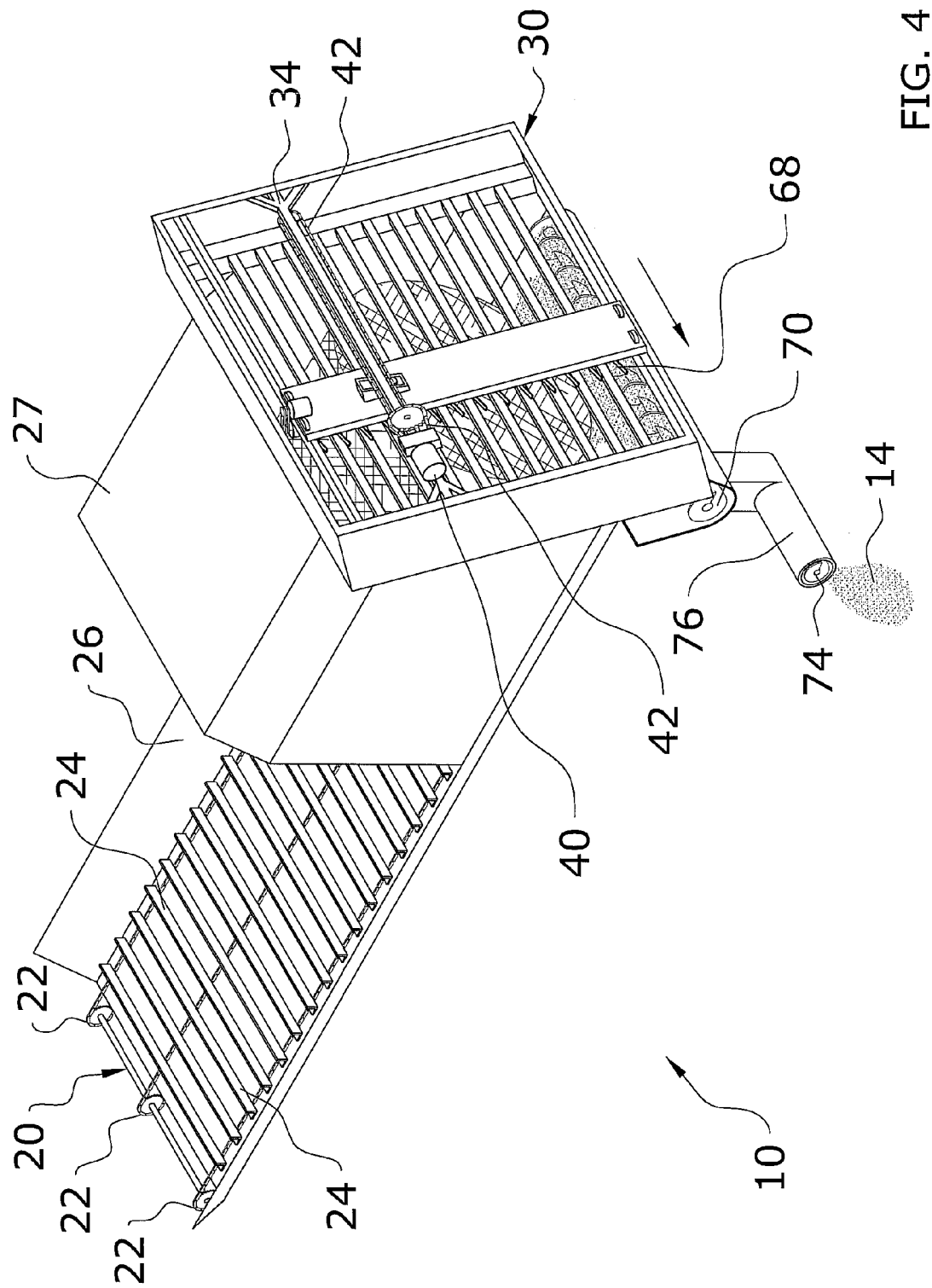
FIG. 4 is an upper perspective view of the present invention in use with the shredding unit shredding a straw bale and the shredding unit moving in a second direction.

The plurality of blades 68, 69 preferably includes a plurality of first blades 68 and a plurality of second blades 69 as illustrated in FIGS. 2, 5 and 6. The first blades 68 and the second blades 69 are preferably comprised of a substantially similar configuration. Each of the first blades 68 are preferably positioned on an opposing side of the rotating member 64 as the corresponding second blade 69. Further, each corresponding first blade 68 and second blade 69 are preferably positioned in-between a pair of separator members 32 as shown in FIGS. 1 through 7.

The first blades 68 and the second blades 69 are also preferably spaced equidistant along a longitudinal axis of the rotating member 64. Further, the first blades 68 and the second blades 69 are preferably positioned along the rotating member 64 in a manner in which the first blades 68 and the second blades 69 form a spiral outline along the rotating member 62. It is appreciated that the plurality of blades 68, 69 may be positioned in various configurations along the rotating member 64 rather than the preferred embodiment.

F. Second and Third Transfer Units

A second transfer unit 70 is preferably positioned below the shredding unit 50 and transports the shredded straw 14 from the straw bale 12 away from the biomass shredder system 10 as illustrated in FIGS. 1 through 6. The second transfer unit 70 is preferably comprised of a standard auger configuration; however it is appreciated that the second transfer unit 70 may be comprised of various configurations rather than the preferred embodiment, such as but not limited to a conveyer. The second transfer unit 70 preferably perpendicularly intersects the longitudinal axis of the first transfer unit 20. A first longitudinal length of the second transfer unit 70 is also preferably substantially similar to a second longitudinal length of the separator members 32.

The second transfer unit 70 is preferably surrounded on a lower side by a first guide member 72 as shown in FIGS. 1 through 6. The first guide member 72 ensures that all the shredded straw 14 from the shredding unit 50 is retrieved by the second transfer unit 70.

A second guide member 76 preferably extends from the first guide member 72 as shown in FIGS. 1 through 4. The second guide member 76 is preferably comprised of a substantially tubular configuration. The second guide member 76 provides a further means of transport for the shredded straw 14. The second guide member 76 also preferably includes a third transfer unit 74 and a fan, wherein the third transfer unit 74 and the fan transport the shredded straw 14. The third transfer unit 74 is preferably comprised of an auger configuration; however it is appreciated that the third transfer unit 74 may be comprised of various configurations rather than the preferred embodiment, such as but not limited to a conveyer. It is appreciated that other methods of transportation may be utilized when transporting the shredded straw 14 away from the biomass shredder system 10.

G. In Use

In use, the straw bales 12 are first placed on the first transfer unit 20 as illustrated in FIGS. 1 and 5. The sensors 29 then through detection of the straw bales 12 or non-detection of the straw bales 12 send a signal out to either engage or disengage the first transfer unit 20. For example, as the amount of straw bales 12 upon the first transfer unit 20 decreases the first transfer unit 20 is engaged by the sensors 29 to move the bales forward and as the amount of straw bales 12 upon the first transfer unit 20 increases the sensors 29 disengage or slow down the forward movement of the straw bales 12 upon the first transfer unit 20 to provide a consistent flow of straw bales 12 into the shredding unit 50.

As the straw bales 12 reach the separator unit 30 they are shredded by the plurality of blades 68, 69 as the blades 68, 69 rotate about the rotating member 64 and move back and forth along the separator members 32. The shredded straw 14 is able to fall directly below the separator unit 30 or pass through the separator channels of the separator members 32 and then fall onto the second transfer unit 70 where the shredded straw 14 is transported to places such as but not limited to a storage bin or a furnace.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A biomass shredder system, comprising:
   a first transfer unit for transporting a mass of material;
   a separator unit positioned adjacent to said first transfer unit to break apart said mass of material transported to said separator unit by said first transfer unit;
   wherein said separator unit is comprised of a plurality of separator members and a plurality of separator channels extending between said plurality of separator members, wherein said plurality of separator channels receive a substantially controlled flow of a separated material from said mass of material;

wherein said plurality of separator members define a rear surface and a front surface, wherein said front surface faces said first transfer unit; and a plurality of blades extending through said plurality of separator channels, wherein said plurality of blades extend forwardly through said plurality of separator channels past said front surface, wherein said plurality of blades are attached to a rotating member, and wherein said rotating member is slidably attached to said separator unit to move side to side.

2. The biomass shredder system of claim 1, wherein said first transfer unit is comprised of a conveyor having a moving surface.

3. The biomass shredder system of claim 1, wherein said front surface of said plurality of separator members are aligned upon a first plane.

4. The biomass shredder system of claim 3, wherein said first plane is at an acute angle with respect to a support surface of said first transfer unit.

5. The biomass shredder system of claim 3, wherein said first plane extends forwardly towards said first transfer unit.

6. The biomass shredder system of claim 1, wherein said plurality of separator members and said plurality of separator channels are substantially horizontal.

7. The biomass shredder system of claim 1, wherein said plurality of blades radially extend from said rotating member.

8. The biomass shredder system of claim 1, including a motor connected to said rotating member to selectively rotate said rotating member.

9. The biomass shredder system of claim 1, wherein an axis of said rotating member is substantially parallel with respect to said rear surface of said plurality of separator members.

10. The biomass shredder system of claim 1, wherein said plurality of blades includes a first set of blades extending from said rotating member upon a plane transverse with respect to a rotational axis of said rotating member, and wherein said first set of blades selectively rotate within a first separator channel of said plurality of separator channels.

11. The biomass shredder system of claim 1, including a drive unit for moving said rotating member along a horizontal plane.

12. The biomass shredder system of claim 1, including at least one sensor to detect the presence of said mass of material.

13. The biomass shredder system of claim 1, wherein said mass of material is comprised of a straw bale.

14. The biomass shredder system of claim 1, including a second transfer unit positioned below said plurality of separator members to receive said separated material.

15. A biomass shredder system, comprising:

a first transfer unit for transporting a mass of material, wherein said mass of material is comprised of a straw bale;

a separator unit positioned adjacent to said first transfer unit to break apart said mass of material transported to said separator unit by said first transfer unit;

wherein said separator unit is comprised of a plurality of separator members and a plurality of separator channels extending between said plurality of separator members, wherein said plurality of separator channels receive a substantially controlled flow of a separated material from said mass of material;

wherein said plurality of separator members define a rear surface and a front surface, wherein said front surface faces said first transfer unit;

a plurality of blades extending through said plurality of separator channels, wherein said plurality of blades extend forwardly through said plurality of separator channels past said front surface;

wherein said first transfer unit is comprised of a conveyor having a moving surface;

wherein said front surface of said plurality of separator members are aligned upon a first plane;

wherein said first plane is at an acute angle with respect to a support surface of said first transfer unit;

wherein said first plane extends forwardly towards said first transfer unit;

wherein said plurality of separator members and said plurality of separator channels are substantially horizontal;

wherein said plurality of blades are attached to a rotating member;

wherein said plurality of blades radially extend from said rotating member;

a motor connected to said rotating member to selectively rotate said rotating member;

wherein an axis of said rotating member is substantially parallel with respect to said rear surface of said plurality of separator members;

wherein said plurality of blades includes a first set of blades extending from said rotating member upon a plane transverse with respect to a rotational axis of said rotating member, and wherein said first set of blades selectively rotate within a first separator channel of said plurality of separator channels;

wherein said rotating member is slidably attached to said separator unit to move side to side;

a drive unit for moving said rotating member along a horizontal plane;

at least one sensor to detect the presence of said mass of material; and a second transfer unit positioned below said plurality of separator members to receive said separated material.

* * * * *